United States Patent Office 3,318,985
Patented May 9, 1967

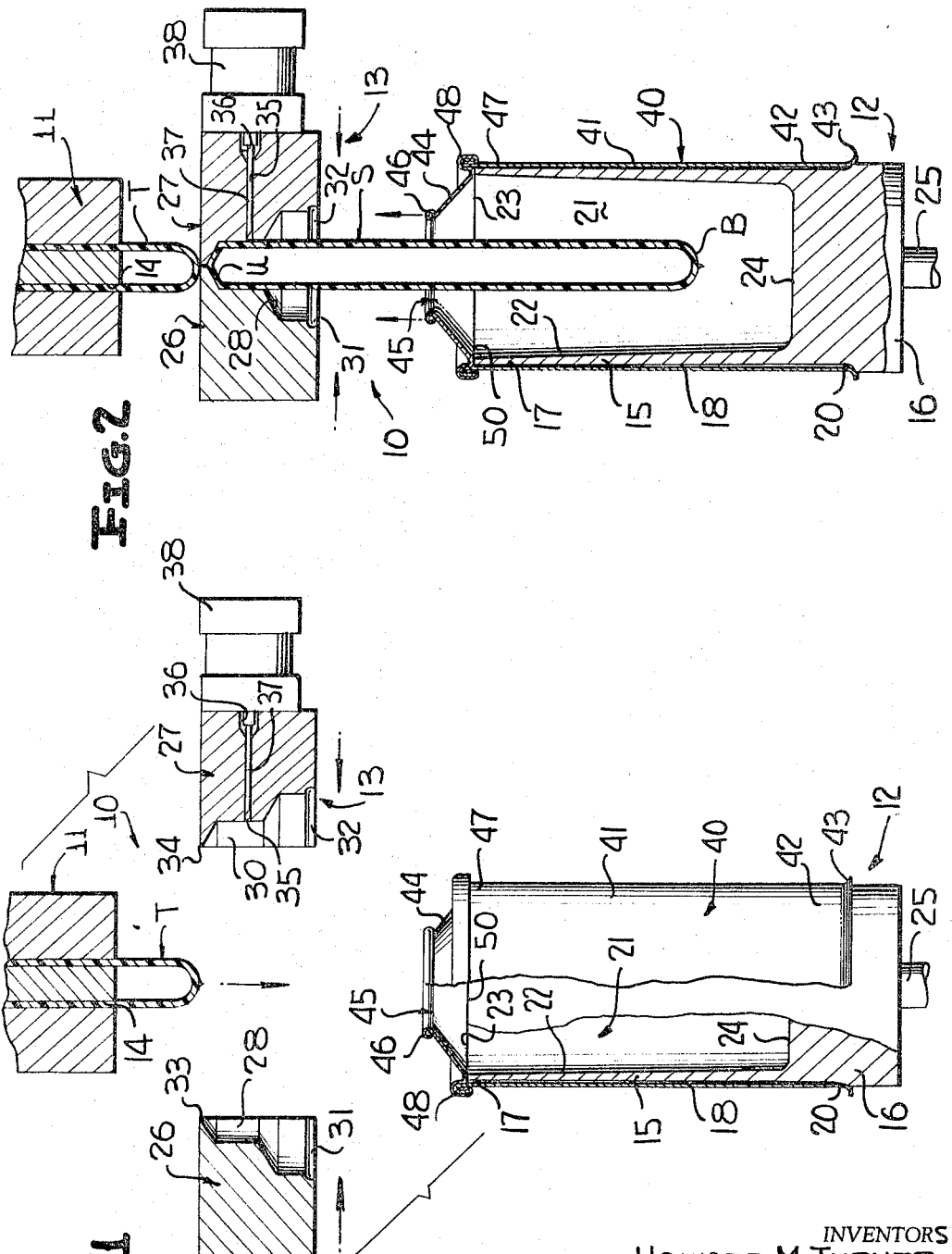

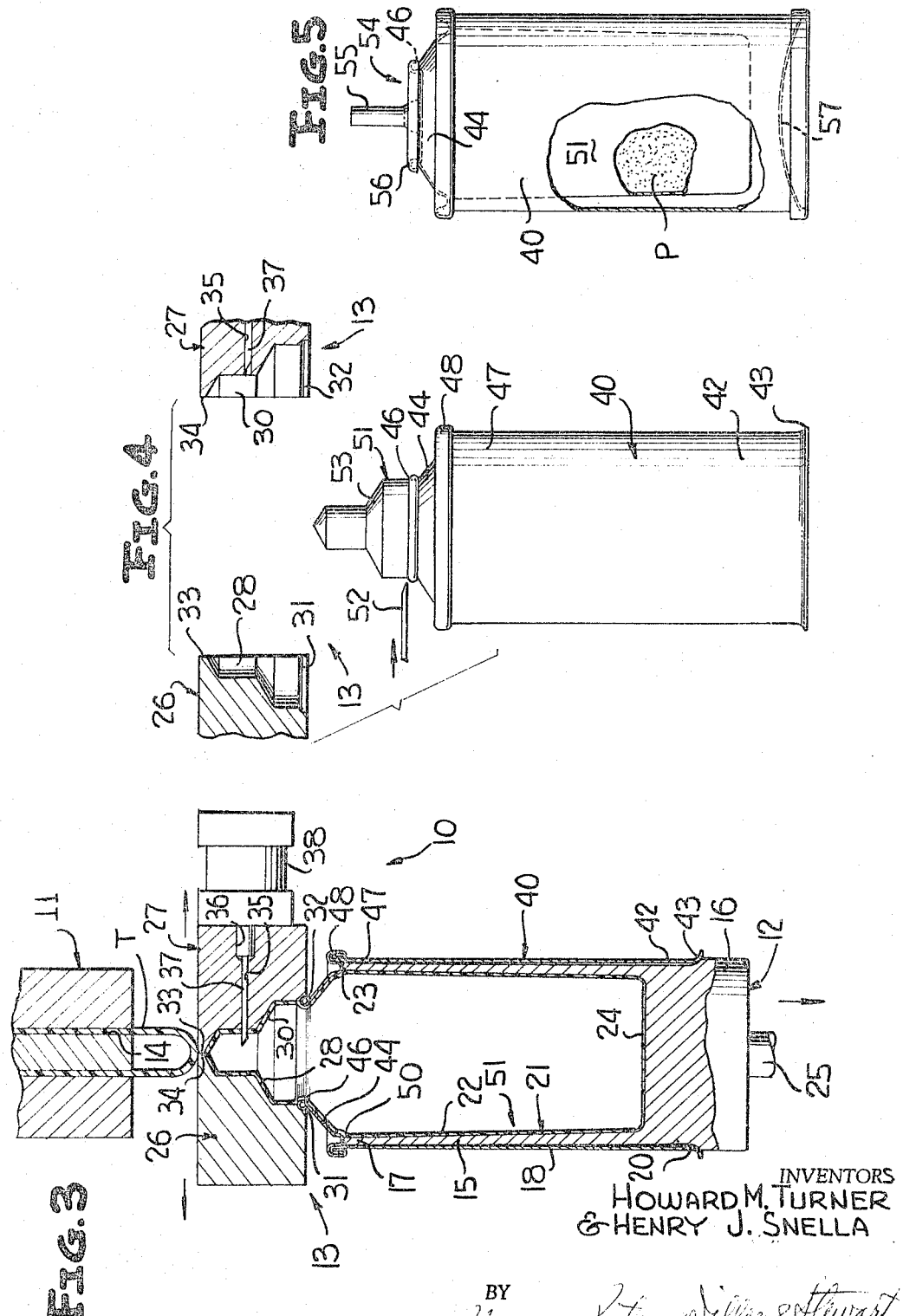

3,318,985
APPARATUS AND METHOD FOR MAKING AEROSOL CANS WITH AN INTEGRAL PLASTIC COMPARTMENT
Howard M. Turner and Henry J. Snella, both of Oak Forest, Ill., assignors to Continental Can Company, Inc., New York, N.Y., a corporation of New York
Filed Apr. 1, 1964, Ser. No. 356,508
19 Claims. (Cl. 264—98)

This invention relates to a novel apparatus for and method of forming a compartmented article, such as a compartmented aerosol container, by molding a flexible, plastic compartment in situ in the container.

The invention particularly relates to plastic molding machines wherein a plastic tube is extruded from an extrusion die into a cavity of a compartment mold through an open end of a container body which is telescoped upon and supported by the compartment mold. The plastic tube is engaged by a neck mold which sequentially clamps off sections of the tube which are sealed by the clamping action of the neck mold. The compartment mold is then moved to bring a portion of the container into sealing contact with the neck mold after which air is introduced into the sealed off section of the tube for the purpose of blowing the sealed off section of the tube to conform to the configuration of the compartment mold cavity. The blown pastic section is thus formed into a plastic compartment contoured to the general configuration of the cavity. The neck mold is then retracted to an open position, and the now combined container body and compartment are removed from the compartment mold. After a suitable trimming operation, the compartment is filled with a dispensable product and a conventional valve cup is attached at the trimmed end of the compartment. The container body is then charged by introducing a suitable propellant into the container body after which the end thereof opposite the valve cup is closed.

A primary advantage of method outlined above is the elimination of the conventional prior art practice of first forming a compartment apart from the container body, introducing the separately formed compartment into a container body and then securing the compartment to the body. In the method of this invention, these latter three steps are performed substantially simultaneously in a novel manner heretofore unprovided for by conventional prior art methods.

In view of the foregoing, it is a primary object of this invention to provide a novel apparatus for and method of producing a compartmented container by forming a compartment of plastic material blown in situ in a container body.

A further object of this invention is to provide a novel method of forming a compartmented container by telescoping a container body relative to a compartment mold having a compartment defining cavity whereby the mold is positioned internally of the container body, molding a flexible compartment in the cavity of the compartment mold, and removing the compartment mold from the container body while retaining the compartment in the container body.

Still another object of this invention is to provide a novel method of forming a compartmented article by providing a tubular article body open at opposite end portions thereof, telescoping the body upon a compartment mold such that the compartment mold is received internally of the body through one of the end portions thereof, extruding a plastic tube into a cavity of the compartment mold through the other of the end portions of the body, expanding the plastic tube to the configuration of the compartment cavity, and removing the compartment mold from the article without removing the molded compartment.

A further object of this invention is to provide a novel method of forming, filling and charging a compartmented dispensing container by inserting a compartment mold into the interior of a container body, molding a flexible compartment in the compartment mold, removing the compartment mold from the container body while retaining the compartment in the container body, filling the compartment with a dispensable product, securing a dispensing valve to the container body in communication with the compartment, admitting a pressurized propellant into the container body and thereafter closing the container body to prevent the escape of the propellant.

Another object of this invention is to provide novel apparatus for forming a compartmented article including first means defining a mold cavity, and means for molding a flexible compartment in the cavity of the first means when the first means is positioned internally of an article to form a flexible compartment having exterior surface portions spaced from interior surface portions of the article.

Another object of this invention is to provide novel apparatus for forming a compartmented container body comprising a compartment mold having a compartment defining cavity, means for positioning the compartment mold internally of the container body through a first open end portion thereof and means for molding a flexible compartment in the cavity through a second end portion of the container body opposite the first end portion.

Still another object of this invention is to provide novel apparatus for forming a compartmented container body including a compartment mold, means for supporting a container body by the mold, means for extruding a plastic tube into a cavity of the mold, means for severing the plastic tube and sealing the same, means for moving the mold and the container body relative to the plastic tube to bring the container body into contact with second mold means, and means for expanding the tube to the configuration of the compartment mold and a portion of the container body.

A further object of this invention is to provide a novel compartment mold including a body having interior surface portions defining a compartment cavity and means for supporting a tubular article telescoped externally upon the compartment mold body.

With the above, and other objects in view that will hereinafter appear, the nature of the invention will be more clearly understood by reference to the following detailed description, the appended claims and the several views illustrated in the accompanying drawings:

In the drawings:

FIGURE 1 is a fragmentary vertical sectional view partially in elevation of the novel apparatus of this invention, and illustrates an open ended container body supported by a compartment mold in axial alignment with an extrusion die, and an open neck mold.

FIGURE 2 is a fragmentary vertical sectional view similar to FIGURE 1 and illustrates a plastic tube partially extruded into a cavity of the compartment mold through an open end of the container body and the neck mold in a closed position clamping off a section of the tube.

FIGURE 3 is a fragmentary vertical sectional view of the apparatus of FIGURES 1 and 2, and illustrates an upper end of the container body in sealing contact with the closed neck mold and a plastic compartment blown in situ in the container body.

FIGURE 4 is a fragmentary sectional view of the neck ring and an elevational view of the unified container body and plastic compartment, and illustrates a blade prior to severing the portion of the plastic compartment formed in the neck mold.

FIGURE 5 is a side elevational view of the compartmented container of this invention with portions thereof broken away for clarity and illustrates a dispensable product packaged in the plastic compartment, a valve cup secured to a top of the container, and a closure secured to the bottom of the container subsequent to charging the dispensing container with a suitable propellant.

The novel apparatus of this invention is best illustrated in FIGURES 1 through 3 of the drawings to which attention is directed and is generally referred to by the reference numeral 10. The apparatus 10 comprises an extrusion means 11, a first mold means 12, and a second mold means 13.

The extrusion means 11 is a conventional extrusion die having an extrusion orifice 14. The extrusion die 11 forms part of a conventional extrusion machine (not shown) which operates in a known manner to extrude a tube or parison T through the extrusion orifice 14 of the extrusion die 11. The plastic material of the tube T is preferably polyethylene, but similar thermoplastic polymers may form the material of the plastic tube T.

The extrusion die 11, the extrusion orifice 14 thereof, and the plastic tube T are each in axial alignment with the first mold means or compartment mold 12, and the compartment mold 12 is normally spaced a substantial distance from the extrusion die 11, as is best illustrated in FIGURES 1 and 2 of the drawings.

The compartment mold 12 comprises a generally cylindrical body 15 having a thickened, closed bottom end portion 16 and an upper open end portion 17. An exterior cylindrical surface 18 of the cylindrical container body 15 terminates at the bottom end portion 16 in an outwardly directed peripheral shoulder 20.

The compartment mold 12 includes a compartment cavity 21 in axial alignment with the extrusion die 11, the extrusion orifice 14 thereof, and the extruded plastic tube T. The compartment cavity 21 is defined by a generally cylindrical internal surface 22 which tapers radially inwardly and downwardly a slight amount between an end face 23 of the upper end portion 17 and a generally circular interior surface 24 of the bottom end portion 16.

Means 25 comprising a piston rod forming a portion of a conventional air cylinder (not shown) is secured to the thickened bottom end portion 16 of the container body 15. The piston rod 25 is also axially aligned with the extrusion die 11, the extrusion orifice 14 thereof and the plastic tube T. The piston rod 25 moves the compartment mold 12 from the position shown in FIGURE 1 to the position shown in FIGURE 3 when air is introduced into the cylinder (not shown) in a conventional manner, and the withdrawal of the air from the cylinder causes the retraction of the compartment mold 12 from the position shown in FIGURE 3 to the position shown in FIGURE 1 in a manner and for a purpose to be described more fully hereafter.

The second mold means 13 comprises a neck mold including a pair of substantially identical, semi-cylindrical mold bodies 26 and 27. The mold bodies 26 and 27 include respective mold cavities 28 and 30. A lowermost radially inwardly opening sealing groove portion 31 of the cavity 28 opposes a complementary sealing groove portion 32 of the cavity 30. A planar wall portion 33 of the mold body 26 opposes an identical wall portion 34 of the mold body 27. The purposes of the sealing groove portions 31 and 32 and the wall portions 33 and 34 will be fully set forth hereafter.

The mold body 27 is radially bored at 35 and counterbored at 36. A conventional blow needle 37 is mounted for reciprocal movement in the bores 35 and 36 from the position shown in FIGURE 1 to the position shown in FIGURE 3. The blow needle 37 includes a piston (not shown) mounted for reciprocal movement in a conventional air cylinder 38. When air is introduced in a conventional manner into the cylinder 38 to one side of the piston (not shown) of the blow needle 37 through a conventional fitting (also not shown) the blow needle 37 is retracted to or maintained in the retracted position thereof as shown in FIGURES 1, 2 and 4 of the drawings. However, when air is similarly introduced in a conventional manner through another fitting (also not shown) in fluid communication with the opposite end of the piston in the cylinder 38, the blow needle 37 is reciprocated from the position shown in FIGURE 1 to the position shown in FIGURE 3 and air is simultaneously transmitted through the blow needle 37 in a manner to be described fully hereafter.

The novel method of forming a compartmented container in accordance with this invention is initiated by telescoping an article 40 (FIGURE 1), such as a conventional aerosol container or can body, upon and exteriorly of the compartment mold 12. The container body 40 includes a tubular body wall 41 which substantially complements the exterior surface 18 of the compartment mold body 15 of the compartment mold 12. A lower end portion 42 of the container body 40 is provided with a radially outwardly directed peripheral flange 43 defining an open bottom end portion of the container body 40. The flange 43 seats upon and is partially supported by the peripheral shoulder 20 of the compartment mold 12.

A dome-like top 44 having an axial opening 45 defined by an outwardly and downwardly directed curl 46 is secured to an upper end portion 47 of the container body 40 by a conventional double seam 48. The top 44 is generally conical in shape and terminates adjacent the double seam 48 in an annular portion 50 which seats upon and is partially supported by the edge 23 of the compartment body 15.

After the container body 40 has been positioned upon the compartment mold 12 in the manner shown in FIGURE 1, the tube T of plastic material is extruded from the extrusion orifice 14 of the extrusion die 11 downwardly (as viewed in FIGURE 1) through the opening 45 of the container body 40 and into the compartment cavity 21 of the compartment mold 12 to the position illustrated in FIGURE 2 of the drawings at which point a sealed bottom B of the tube T is spaced from the bottom surface 24 of the cavity 21.

The mold bodies 26 and 27 of the second mold means 13 are then moved by a conventional mechanism (not shown), such as a piston and fluid cylinder combination, in the direction of the directional arrows of FIGURE 1 to the position shown in FIGURE 2. This movement closes the mold bodies 26 and 27 and the respective wall portions 33 and 34 clamp and seal an upper portion U of the plastic tube T therebetween to form a closed plastic tubular section S.

The compartment mold 12 is then reciprocated vertically upwardly in the direction of the directional arrows of FIGURE 2 of the drawings by the upward movement of the piston rod 25 of the conventional piston and cylinder combination heretofore mentioned. This upward movement of the compartment mold 12 continues until the curl 46 of the container body 40 is seated in sealing contact with the sealing groove portions 31 and 32 of the respective mold bodies 26 and 27. This movement of the compartment mold 12 also brings the bottom portion B of the closed tubular section S of the tube T close to but slightly spaced from the bottom surface 24 of the compartment mold cavity 21 (not shown).

The blow needle 37 is then reciprocated radially inwardly from the position shown in FIGURE 2 to the position shown in FIGURE 3 in the conventional manner heretofore described at which time the blow needle 37 penetrates the upper portion U of the section S whereafter air is introduced through the blow needle 37 into the tubular section S which expands the same outwardly to the general configuration of the compartment mold cavity 21, the exposed inner surface of the top 44 and the cavities 28 and 30 to form a closed compartment 51 (FIGURE 3). After the plastic material of the closed compartment 51 has cooled sufficiently, the bodies 26 and 27 of the neck mold 13 and the compartment mold 12 are retracted in the direction of the directional arrows of FIGURE 3 to the initial positions thereof shown in FIGURE 1. During the retraction of the neck mold 13, the blow needle 37 is reciprocated wholly into the bore 35, as shown in FIGURE 4 of the drawings.

The container body 40, including the closed compartment 51 blown in situ, is then removed from the exterior surface 18 of the compartment mold 12. This is accomplished by telescoping the container body 40 and the closed compartment 51 upwardly as viewed in FIGURE 3 of the drawings after the compartment mold 12 has been reciprocated downwardly to the position shown in FIGURE 1. The adhesion between the plastic material of the closed compartment 51 and the inner surface (unnumbered) of the top 44 including the curl 46 prevents the removal of the closed compartment 51 from the interior of the container body 40. Furthermore, if desired or found necessary, the compartment mold cavity 21 can be provided with a conventional release agent prior to the extrusion of the plastic tube T into the cavity 21 of the compartment mold 12. The interior surface of the top 44 of the container body 40 can be similarly conventionally treated to increase the adhesion or bond between this inner surface and the portion of the closed compartment 51 in contact therewith.

After the container body 40 and the closed compartment 51 have been removed from the compartment mold 12 (FIGURE 4), a conventional cutting tool or shear 52 is employed to sever an upper end portion 53 of the closed compartment 51 in the manner illustrated in FIGURE 4 of the drawings. After the removal of the severed portion 53 of the closed compartment 51, the now open compartment 51 is filled with a dispensable product P (FIGURE 5) through the opened upper end thereof and a conventional valve cup 54 having a dispensing nozzle 55 is secured to the curl 46 of the top 44 by a conventional seam 56.

After the compartment 51 has been filled with the product P and the valve cup 54 has been attached, the container body 40 is inverted end-for-end and a pressurized propellant is added through the bottom portion 42 of the container body 40. The propellant occupies the volume between the compartment 51 and the container body 40, noting that the compartment 51 is spaced from the wall 41 of the compartment body 40. A bottom 57 is then conventionally double seamed to the body portion 42 of the container body 40 and reverted to the upright position shown in FIGURE 5 of the drawings.

The product P is dispensed from the compartment 51 by manipulating the dispensing nozzle 55 of the valve cup 54 in a conventional manner. Since the pressure of the propellant is greater than atmospheric pressure, the propellant between the container body 40 and the compartment 51 collapses the relatively thin flexible plastic material of the compartment 51 to dispense the product P through the dispensing nozzle 55 of the valve cup 54.

While the description of this invention has been directed primarily to providing compartmented aerosol containers, it is to be understood that both the method and apparatus are adapted for forming a compartment in any articles which are generally open-ended at opposite end portions thereof. Furthermore, this disclosure is not intended to be limited solely to generally cylindrical tubular container bodies nor to the particular material from which such container bodies are manufactured. For example, while the container body 40 is preferably constructed from metallic material and is cylindrical in transverse cross-section, this invention is considered inclusive of articles which are other than cylindrical in transverse cross-section, such as square, rectangular, oval, octagonal, etc., and which can equally be constructed from paperstock, plastic or similar material.

Although the invention has been described in connection with certain specific structural features, and method steps, it will be understood that variations in the structures and steps may be resorted to without departing from the spirit and scope of this invention as defined in the appended claims.

We claim:
1. A method of forming a compartmented article comprising the steps of inserting a mold into an article through an opening therein, forming a compartment having at least one closed end in a cavity of the mold removing the mold from the article without removing the formed compartment, and retaining the formed compartment in the article.

2. A method of forming a compartmented article comprising the steps of providing an article which includes a chamber defined by interior surface portions including at least one opening defining portion, positioning a mold in the article, molding a compartment in the mold having at least one closed end and exterior surface portions substantially entirely spaced from the chamber defining surface portions of the chamber, securing the compartment to the article, and removing the mold from the article.

3. A method of forming a compartmented article comprising the steps of inserting a compartment mold into an article, molding a compartment having at least one closed end in a cavity of the mold, removing the mold from the article without removing the molded compartment, and retaining the formed compartment in the article.

4. A method of forming a compartmented article comprising the steps of forming an article, positioning a compartment mold in the article, extruding a parison into the compartment mold, expanding the parison to the configuration of the compartment mold, removing the compartment mold from the article, and securing a portion of the expanded parison to the article.

5. A method of forming a compartmented article comprising the steps of providing a tubular article opened at opposite end portions thereof, inserting a compartment mold into the article through one of the end portions, extruding a parison into the compartment mold through the other of the end portions, expanding the parison to the configuration of the compartment mold, removing the compartment mold from the article through the one end portion, and retaining the expanded parison in place in the article.

6. A method of forming, filling and charging a dispensing container comprising the steps of inserting a compartment mold into the interior of a container body, molding a flexible compartment in the compartment mold, removing the compartment mold from the container body, retaining the compartment in the container body, filling the compartment with a dispensable product, securing a dispensing valve to the container body in communication with the compartment, admitting a pressurized propellant into the container body and thereafter closing the container body to prevent the escape of the propellant.

7. A method of forming, filling and charging a dispensing container comprising the steps of telescoping a container body relative to compartment mold having a compartment defining cavity whereby the mold is positioned internally of the body, molding a flexible compartment in the cavity of the compartment mold, removing the compartment mold from the body, retaining the compartment in the container body, and filling the compartment with a dispensable product, securing a dispensing valve to the container body in communication with the compartment, admitting a pressurized propellant into the container body and thereafter closing the container body to prevent the escape of the propellant.

8. A method of forming, filling and charging a dispensing container comprising the steps of inserting a compartment mold having a compartment defining cavity into a container body, extruding a parison into the cavity, expanding the parison to conform a portion of the parison to the configuration of the cavity and another portion of the parison to the configuration of a portion of the container body whereby the first-mentioned portion defines a compartment body and the second-mentioned portion secures the compartment body to the container body, removing the compartment mold from the body while retaining the compartment body in the container body, filling the compartment body with a dispensable product, securing a dispensing valve to the container body adjacent the second-mentioned portion and in communication with the compartment body, admitting a pressurized propellant into the container body and thereafter closing the container body to prevent the escape of the propellant.

9. A method of forming a compartmented article comprising the steps of inserting a compartment mold having a cavity internally of a tubular article through a first open end portion thereof, extruding a parison into the cavity through a second open end portion of the tubular article, expanding the parison to form a flexible compartment having a body portion contoured to the configuration of the cavity and a securing portion contoured to the configuration of a portion of the container body and removing the compartment mold by withdrawing the same through the first open end portion of the body without removing the compartment.

10. A method of forming a compartmented container comprising the steps of providing a compartment mold having a compartment defining cavity, telescopically positioning the compartment mold internally of a container body through a first open end portion of the latter, molding a flexible compartment in the cavity through a second open end portion of the container body opposite the first open end portion, and telescopically removing the mold relative to the container body without removing the flexible compartment from the container body.

11. Apparatus for forming a compartment in an article comprising first means defining a compartment cavity, second means for inserting and removing said first means relative to an article, and third means for molding a compartment having at least one closed end in said cavity during the positioning of the first means in an article.

12. Apparatus for forming a compartment in an article comprising first means including interior surface means defining a mold cavity, said first means including exterior surface means positionable into intimate relationship with interior surface portions of an article, means for molding a flexible closed end compartment against the interior surface means of said mold cavity and means for removing the mold cavity from the article after the molding of the compartment.

13. Apparatus for forming a compartment in an container comprising a removable compartment mold having a compartment defining cavity, means for molding a flexible compartment having at least one closed end in the cavity of the mold when the mold is positioned internally of an article to form a flexible compartment having exterior surface portions spaced from interior surface portions of the article upon the termination of the molding of the compartment by said means and the removal of said mold from the interior of the article, and means for securing a portion of said flexible compartment to said article.

14. Apparatus for forming a compartment in an container body comprising a compartment mold having a compartment defining cavity, means for positioning the compartment mold internally of the container body through a first open end portion thereof, means for molding a flexible compartment having at least one closed end in said cavity through a second open end portion of the container body opposite the first open end portion and means for removing the mold from the container body.

15. The apparatus as defined in claim 14 wherein means are provided for telescopically inserting and removing said mold with respect to the container body.

16. Apparatus for forming a compartmented container body comprising a compartment mold having a compartment defining cavity, means for inserting said mold into and removing said mold from a container body, means for extruding a parison in said cavity, and means for expanding said parison to the configuration of said cavity thereby forming a compartment spaced from said body upon the removal of said mold by said inserting means.

17. Apparatus for forming a compartmented container body comprising a compartment mold having a compartment defining cavity, means for inserting said mold into and removing said mold from a container body, said mold including means for supporting a container body upon the insertion of said mold therein, means for extruding a parison in said cavity, and means for expanding said parison to the configuration of said cavity thereby forming a compartment spaced from said body upon the removal of said mold by said inserting means.

18. Apparatus for forming a compartmented container body comprising a compartment mold, means for supporting a container body by the mold, means for extruding a parison into a cavity of the mold, means for severing the parison, means for moving the mold and container body relative to the parison and the container body into contact with second mold means, and means for expanding the parison to the configuration of the compartment mold and a portion of the container body.

19. A molding mechanism comprising a body having interior surface portions defining a compartment cavity, means for supporting a tubular article telescoped externally upon said body, means for extruding a parison in internal relationship to both said cavity and said article, and means for expanding said parison against said interior surface portion.

References Cited by the Examiner
UNITED STATES PATENTS 2,684,502 7/1954 Paulve _____ 18—36
2,805,787 9/1957 Sherman _____ 264—94 XR ROBERT F. WHITE, *Primary Examiner.*

ALEXANDER H. BRODMERKEL, *Examiner.*

A. R. NOE, *Assistant Examiner.*